(12) United States Patent
Wuebbolt-Gorbatenko et al.

(10) Patent No.: US 12,331,815 B2
(45) Date of Patent: Jun. 17, 2025

(54) CHASSIS ACTUATOR AND METHOD FOR OPERATING A TRANSMISSION ASSEMBLY OF A CHASSIS ACTUATOR

(71) Applicant: Schaeffler Technologies AG & Co. KG, Herzogenaurach (DE)

(72) Inventors: Benjamin Wuebbolt-Gorbatenko, Erlangen (DE); Alexander Hausmann, Erlangen (DE); Daniel Faber, Nuremberg (DE); Alena Pöhnlein, Lonnerstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 241 days.

(21) Appl. No.: 17/594,954

(22) PCT Filed: Apr. 22, 2020

(86) PCT No.: PCT/DE2020/100330
§ 371 (c)(1),
(2) Date: Nov. 4, 2021

(87) PCT Pub. No.: WO2020/228891
PCT Pub. Date: Nov. 19, 2020

(65) Prior Publication Data
US 2022/0252141 A1    Aug. 11, 2022

(30) Foreign Application Priority Data

May 13, 2019    (DE) ..................... 10 2019 112 480.8

(51) Int. Cl.
*F16H 25/20*    (2006.01)
*B62D 5/04*    (2006.01)
*F16H 25/22*    (2006.01)

(52) U.S. Cl.
CPC ..... *F16H 25/2252* (2013.01); *F16H 25/2003* (2013.01); *B62D 5/0445* (2013.01); *F16H 2025/2096* (2013.01)

(58) Field of Classification Search
CPC ............... B62D 5/0445; F16H 25/2003; F16H 25/2006; F16H 25/2252; F16H 2025/2096
See application file for complete search history.

(56) References Cited

U.S. PATENT DOCUMENTS

| 2011/0220432 A1* | 9/2011 | Bugosh ................ B62D 5/0448 180/444 |
| 2012/0200009 A1* | 8/2012 | Verhagen ................ F16H 25/24 74/424.81 |

(Continued)

FOREIGN PATENT DOCUMENTS

| CN | 202768795 U | 3/2013 |
| CN | 103291870 A | 9/2013 |

(Continued)

OTHER PUBLICATIONS

Title : Sedan Construction, Editor in chief : Deng Chunan, Published and distributed by : People's Transportation Press, Executive Summary Year: 2000, pp. 14 Pages.

(Continued)

*Primary Examiner* — Victor L MacArthur
*Assistant Examiner* — Gregory T Prather
(74) *Attorney, Agent, or Firm* — Matthew V. Evans

(57) ABSTRACT

A chassis actuator (1), in particular for a rear axle steering system, includes a rotational-linear transmission (5) which is provided for coupling, on the output side, to a chassis element, wherein a rotatable, input-side element (9) of the transmission (5) is mounted in a housing (13) by means of at least one axial bearing (16, 17). The transmission (5) is self-lockingly set by means of an adjustable preloading (Continued)

device (21), which loads the axial bearing (16, 17) with an axial force.

15 Claims, 3 Drawing Sheets

(56) References Cited

U.S. PATENT DOCUMENTS

| | | | | |
|---|---|---|---|---|
| 2015/0183455 | A1* | 7/2015 | Wang | F16C 19/547 |
| | | | | 180/444 |
| 2016/0311463 | A1* | 10/2016 | Morinaga | B62D 5/0421 |
| 2019/0118854 | A1* | 4/2019 | Tate | B62D 5/001 |
| 2020/0231202 | A1* | 7/2020 | Graeuler | F16H 25/20 |

FOREIGN PATENT DOCUMENTS

| | | |
|---|---|---|
| CN | 206206041 U | 5/2017 |
| DE | 19540634 C1 | 3/1997 |
| DE | 102008024910 A1 | 11/2009 |
| DE | 102013211230 A1 | 12/2014 |
| DE | 102015212333 A1 | 1/2017 |
| DE | 102015221556 A1 | 5/2017 |
| DE | 102017109046 B3 | 5/2018 |
| DE | 102017124388 A1 | 1/2019 |
| JP | H0562334 A | 3/1993 |
| WO | 2015081951 A1 | 6/2015 |
| WO | 2018149441 A1 | 8/2018 |

OTHER PUBLICATIONS

Author: Zhou Ying, Title: Automotive Design Manual, Source: Vinca Vehicle Institute, 1998, 10 Pages.
Authors: Guan Ying, Title: CNC Application Technology, Source: Higher Education Planning Textbook for the 21st Century Digital control Applications, Southwestern Travel University Press, 1st Edition, date: Aug. 2006, pp. 120-121.

* cited by examiner

CHASSIS ACTUATOR AND METHOD FOR OPERATING A TRANSMISSION ASSEMBLY OF A CHASSIS ACTUATOR

CROSS-REFERENCE TO RELATED APPLICATIONS

This application is the U.S. National Phase of PCT Appln. No. PCT/DE2020/100330 filed Apr. 22, 2020, which claims priority to DE 10 2019 112 480.8 filed May 13, 2019, the entire disclosures of which are incorporated by reference herein.

TECHNICAL FIELD

The disclosure relates to a chassis actuator, in particular suitable for use in a rear axle steering system of a motor vehicle. The disclosure also relates to a method for operating a transmission assembly of such a chassis actuator.

BACKGROUND

A generic chassis actuator is known for example from WO 2018/149441 A1. The known chassis actuator is part of a device for adjusting the level of a motor vehicle and comprises a spindle nut which is rotatably mounted with the aid of an axial bearing. To block the spindle nut, a locking unit is provided which comprises a locking contour, which rotates when the spindle nut rotates, and a deflectable locking lever.

A device for steering a rear axle of a motor vehicle is described, for example, in DE 2013 211 230 A1. This device comprises an actuator with which a steering movement can be carried out between a fixed point on the vehicle and a pivot point of a steering linkage. To generate a displacement movement, the actuator has a shaft element which is rotatably mounted relative to a housing element. As a means to temporarily prevent a rotational movement between the shaft element and the housing element, the device according to DE 10 2013 211 230 A1 has two pins which are arranged either in the housing element or in the shaft element and can engage in recesses in the other element.

DE 10 2008 024 910 A1 discloses an actuator with a load torque lock which can be used in the chassis of a motor vehicle. In this case, the load torque lock comprises a wrap spring.

SUMMARY

It is desirable to further develop a chassis actuator, in particular with regard to its use in a rear axle steering system, compared to the cited prior art. The configurations and advantages explained below in connection with the operating method also apply analogously to the device, that is the chassis actuator, and vice versa.

The chassis actuator comprises, in a known basic concept, a rotational-linear transmission, which is provided for coupling, on the output side, to at least one chassis element, wherein a rotatable, input-side element of the rotational-linear transmission is mounted in a housing by means of an axial bearing.

An adjustable preloading device is provided, which loads the axial bearing with an axial force, wherein the rotational-linear transmission, possibly in combination with a further upstream transmission, is self-lockingly set by the axial force. The term "self-locking" is known and signifies a characteristic of a transmission in which a force or torque applied to an output transmission element will not rotate or displace a corresponding input transmission element. For example, if actuation or rotation of an input element causes actuation or linear displacement of an output element, a load applied to the output element can not actuate the input element in a self-locking transmission assembly; or, stated otherwise, a self-locking transmission assembly is not backdrivable. In this context, it could also be stated that the axial force provided from the adjustable preloading device achieves a locked condition of the transmission assembly such that displacement of the output transmission element can only occur via actuation of the input element and not via an external force or torque acting on the output element.

If the transmission assembly of the chassis actuator is designed in two stages, namely from a continuously variable transmission and a rotational-linear transmission connected downstream, an input-side element, in particular a rotatable nut, of the rotational-linear transmission is loaded by means of a fine readjustment element, typically in the form of a preloading nut, with an axial force acting on an axial bearing of the rotational-linear transmission in such a way that the overall efficiency of the two-stage transmission assembly is kept below 50%.

Regardless of the number of gear stages, the preloading is preferably set in such a way that, on the one hand, a reliable self-locking operation, i.e., operation of the transmission assembly with an overall efficiency of less than 50% is provided, and, on the other hand, no unnecessarily high friction losses occur in one of the gear stages. The overall efficiency is preferably set to a value of at least 35% and a maximum of 45%. The efficiency is always set by the axial force that loads the input-side element of the rotational-linear transmission.

To adjust the preloading of the axial bearing and thus the efficiency of the rotational-linear transmission to achieve an efficiency value of the transmission assembly that corresponds to self-locking or a locked condition of the transmission assembly, a preloading nut is preferably provided, which is screwed into an internal thread of a housing. Optionally, the setting of the preloading nut, which can be used as a fine readjustment element, can be secured with the aid of a lock nut.

The preloading nut either rests directly on a bearing element of the axial bearing or indirectly exerts an axial force on a bearing element. In both cases, the bearing element is preferably a bearing ring or a bearing washer of a roller bearing. In addition to the axial bearing function, the roller bearing may also fulfill a radial bearing function. This can be implemented with the aid of separate sets of rolling elements, wherein a first set of rolling elements is used exclusively for the axial bearing and a second set of rolling elements is used exclusively for the radial bearing. Here, both sets of rolling elements can roll on one and the same bearing element.

Alternatively, the roller bearing can be designed as a slanted roller bearing, wherein rolling elements, for example spheres, cylindrical rollers or needles, are arranged in the bearing at a contact angle greater than 0° and less than 90°, in particular at least 20° and at most 70°, and can thus be used both for transmitting radial forces and for transmitting axial forces.

The rotational-linear transmission, which converts the rotation of the input-side gear element mounted by means of the preloaded axial bearing into a feed of an output-side gear element, is designed, for example, as a planetary roller gear system. With regard to the design of a planetary roller gear system, reference is made, for example, to documents WO 2015/081951 A1 and DE 10 2015 212 333 A1. In the case of the chassis actuator, the input-side gear element can be the spindle nut of the planetary roller gear system or a part that is connected to the spindle nut in a rotationally-fixed manner. Alternatively, it is possible to provide the planetary gear carrier as a drive element of the planetary roller gear system. In this case, the planetary roller gear system is designed as a true-pitch rotational-linear transmission and, from this perspective, can be compared to a simple transmission thread. With regard to the basic design of a true-pitch planetary roller gear system, reference is made, for example, to DE 195 40 634 C1.

A further transmission, in particular a continuously variable transmission, may be connected upstream of the rotational-linear transmission, in particular a planetary roller gear system. The continuously variable transmission can be a belt drive or a chain drive. Alternatively, it is also possible to drive the input-side element of the rotational-linear transmission via a gearwheel-based transmission. In all cases, the transmission, which is connected upstream of the rotational-linear transmission, is preferably electrically driven, so that the chassis actuator as a whole is designed as an electromechanical actuator.

BRIEF DESCRIPTION OF THE DRAWINGS

In the following, several exemplary embodiments are explained in more detail by means of a drawing. In the figures.

DETAILED DESCRIPTION

Figure 1:
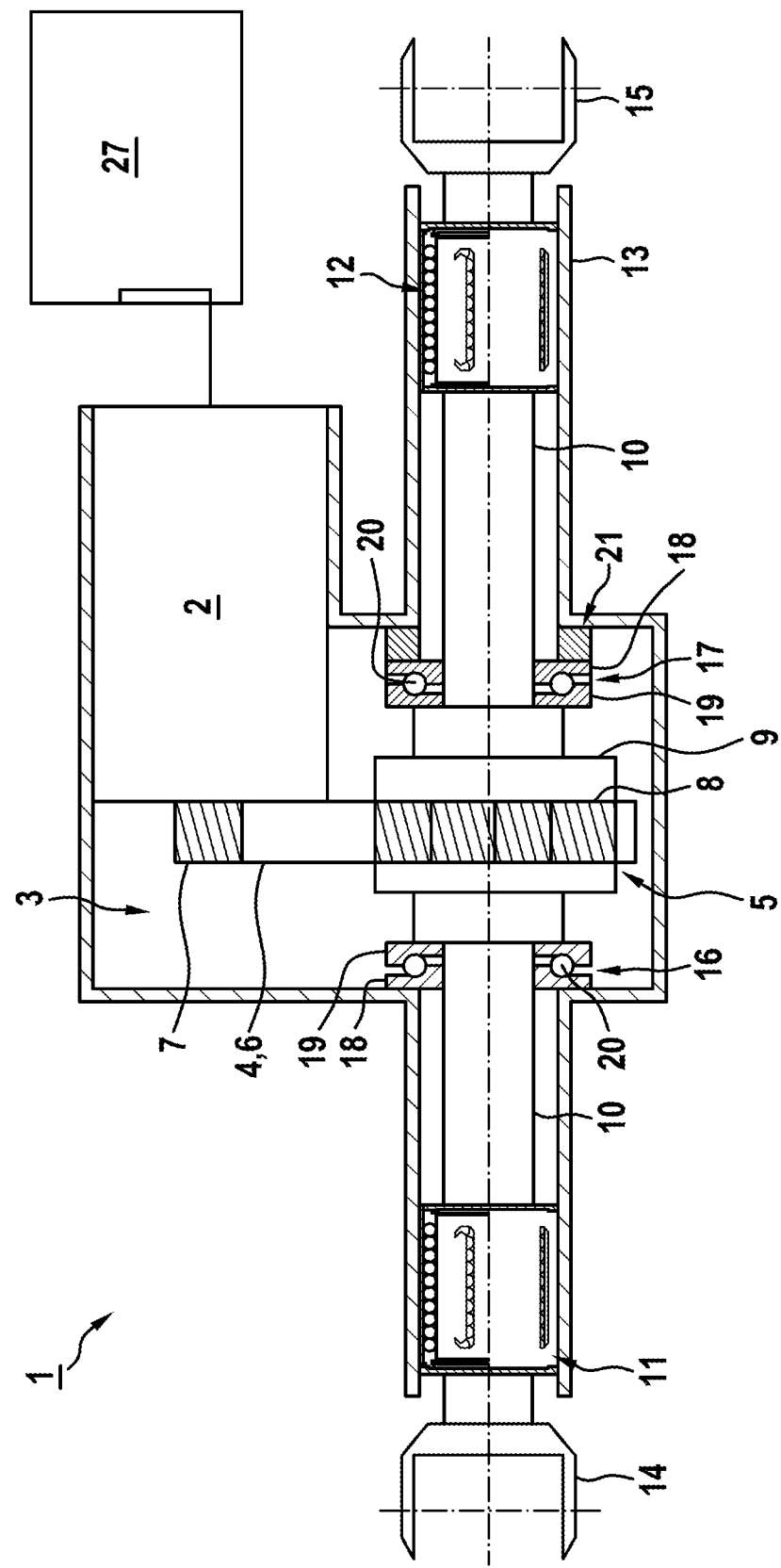
FIG. 1 shows a schematic overview representation of an electromechanical chassis actuator of a rear axle steering system.

Unless otherwise stated, the following explanations relate to all exemplary embodiments. Parts that correspond to each other or have basically the same effect are marked with the same reference symbols in all figures.

A chassis actuator, identified as a whole with the reference symbol 1, is provided for use in a rear axle steering system of a two-axle vehicle, namely a passenger car. The chassis actuator 1 thus represents a steering actuator of a rear axle steering system. An electric motor 2 and a transmission assembly 3 actuated by the electric motor 2 are assigned to the chassis actuator 1. A motor controller of the electric motor 2 is labeled with reference symbol 27. The transmission assembly 3 comprises a continuously variable transmission 4, namely a belt drive, as well as a rotational-linear transmission 5 in the form of a planetary roller gear system, which is connected downstream of the continuously variable transmission 4. A belt of the belt drive 4 is labeled with reference symbol 6. A drive belt wheel 7, which is firmly connected to the motor shaft of the electric motor 2, is coupled to an output belt wheel 8 by the belt 6. The output belt wheel 8 is in turn firmly connected to a spindle nut 9, which represents a rotatable, input-side element of the rotational-linear transmission 5. The corresponding threaded spindle, of the rotational-linear transmission 5, labeled with reference symbol 10, represents its output element.

The threaded spindle 10 is displaceably guided in a housing 13 of the chassis actuator 1 with the aid of linear guides 11, 12. Connection elements 14, 15 are located at the ends of the threaded spindle 10 which enable coupling to the vehicle's wheels to be steered via chassis elements, not shown.

To mount the spindle nut 9 in the housing 13, two axial bearings 16, 17 are provided. Each axial bearing 16, 17 comprises a housing washer 18 and a shaft washer 19 as bearing washers. Spheres 20 act as rolling elements rolling between the bearing washers 18, 19 and can be guided in a cage, not shown.

The chassis actuator 1 further comprises a preloading device 21 which loads the housing washer 18 of the axial bearing 17 with an axial force. The efficiency of the rotational-linear transmission 5, which is designed as a planetary roller gear system, is not heavily dependent on this axial force, but is dependent to a significant extent. The axial force is set by means of the preloading device 21 in such a way that the efficiency of the chassis actuator 1—more precisely: the transmission assembly 3—is at least 35% and a maximum of 45% and thus reliably in the self-locking or locked range, i.e., below 50%, since an efficiency greater than 50% typically corresponds to a non-self-locking or unlocked condition. The above-mentioned efficiency of the entire transmission assembly 3 results from the multiplication of the efficiency of the continuously variable transmission 4 by the efficiency of the rotational-linear transmission 5.

Figure 2:
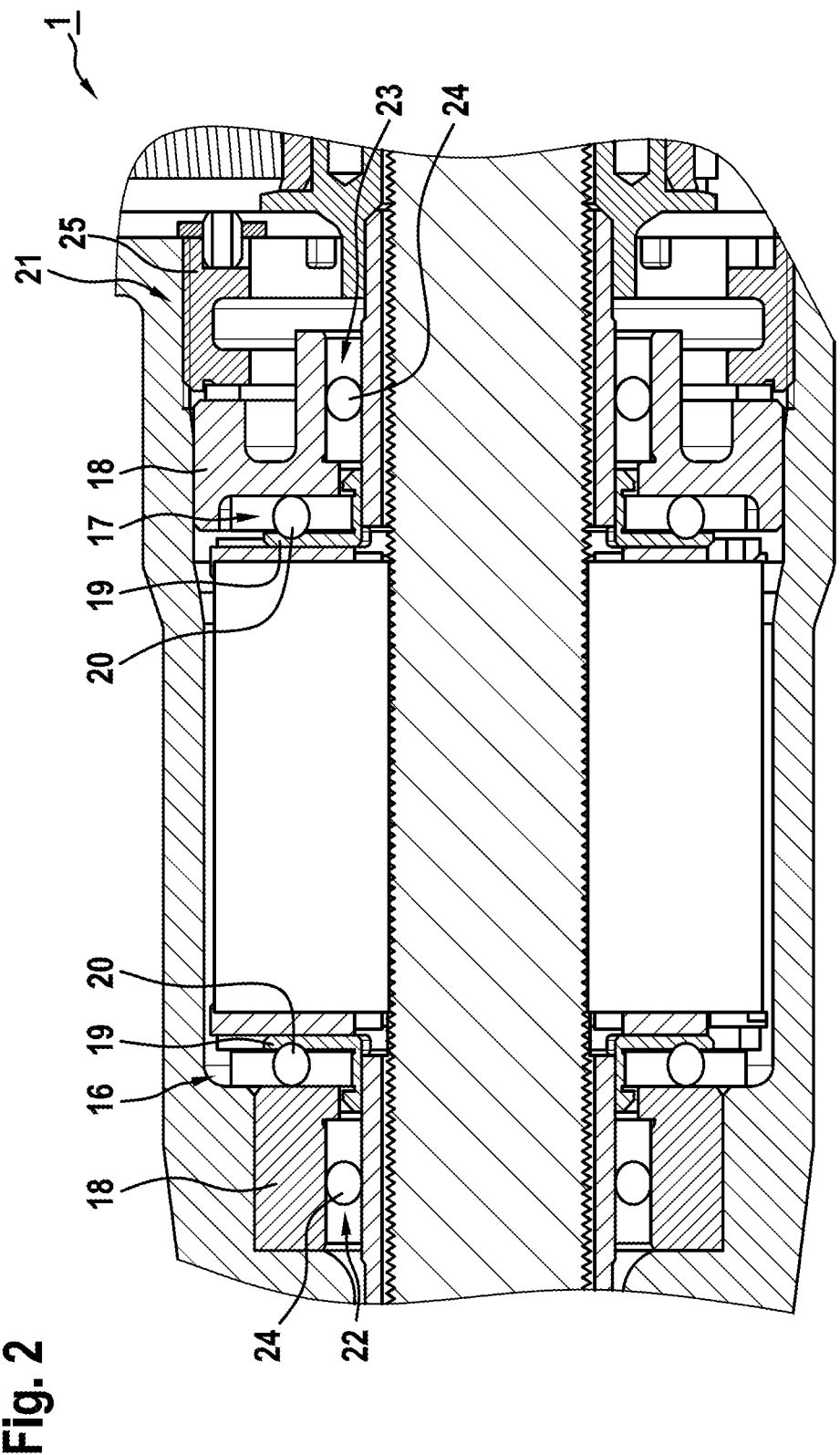
FIG. 2 shows a sectional view of a detail of a chassis actuator for a rear axle steering system of a motor vehicle.
Figure 3:
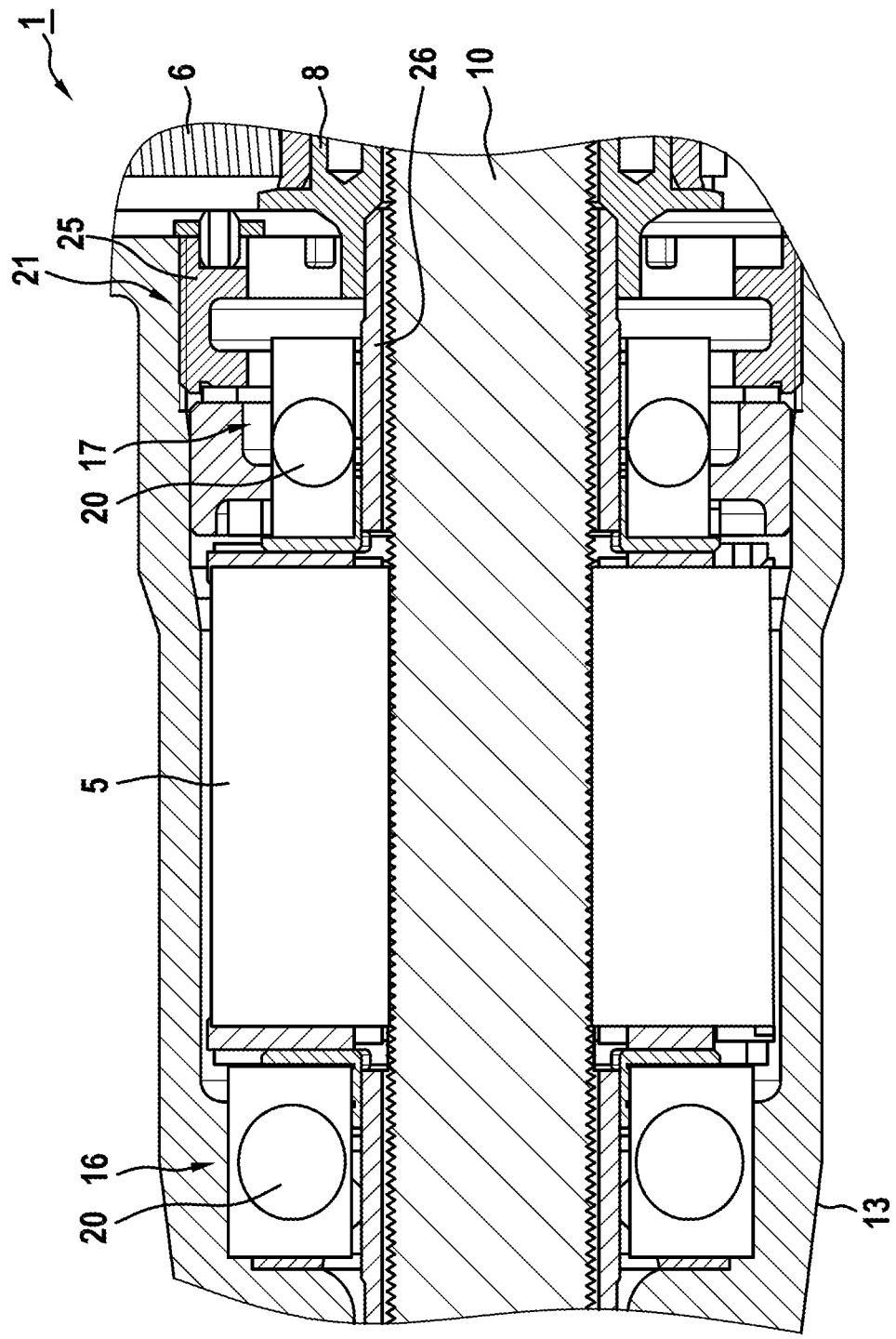
FIG. 3 shows an alternative embodiment of a chassis actuator for a rear axle steering system in a similar representation to FIG. 2.

Various possible configurations of the preloading device 21, which are suitable for the arrangement according to FIG. 1, are illustrated in FIGS. 2 and 3, partly in grossly simplified form.

In the exemplary embodiment according to FIG. 2, two radial bearings 22, 23 can be seen in addition to the axial bearings 16, 17. In the design shown in FIG. 2, the radial bearings 22, 23 comprise spheres 24 as rolling elements. The rolling elements 24 of the radial bearing 22, 23 are not necessarily dimensioned to match the rolling elements 20 of the axial bearings 16, 17. In any case, the row of rolling elements 20, which performs the axial bearing function, rolls on the same housing washer 18 on which the rolling elements 24 performing the radial bearing function also roll.

The exemplary embodiment according to FIG. 3 differs from the exemplary embodiment according to FIG. 2 in that exactly one row of rolling elements 20 is assigned to a rolling bearing 16, 17, wherein, as can also be seen in FIG. 1, an angular ball bearing is designed as an axial-radial bearing. Since the main loading direction is aligned in the axial direction of the chassis actuator 1, that is to say in the longitudinal direction of the threaded spindle 10, the roller bearings 16, 17 are also referred to as axial bearings in this case.

In all of the exemplary embodiments, the preloading device 21 comprises a preloading nut 25 which is screwed into the housing 13 and is generally also referred to as a fine readjustment element. Screwing the preloading nut 25 into the housing 13 is accompanied by an increasing preloading and a decreasing efficiency of the rotational-linear transmission 5.

In FIGS. 2 and 3, the belt 6 and the output belt wheel 8 can also be seen to a limited extent. The output belt wheel 8 is connected to the spindle nut 9 in a rotationally-fixed manner via a sleeve 26 and thus represents a transmission element of the rotational-linear transmission 5.

LIST OF REFERENCE SYMBOLS

1 Chassis actuator
2 Electric motor

3 Transmission assembly
4 Continuously variable transmission, belt drive
5 Rotational-linear transmission, planetary roller gear system
6 Belt
7 Drive belt wheel
8 Output belt wheel
9 Spindle nut
10 Threaded spindle
11 Linear guide
12 Linear guide
13 Housing
14 Connection element
15 Connection element
16 Axial bearing
17 Axial bearing
18 Housing washer
19 Shaft washer
20 Rolling element, sphere
21 Preloading device
22 Radial bearing
23 Radial bearing
24 Rolling element, sphere
25 Preloading nut, fine readjustment element
26 Sleeve
27 Motor controller

The invention claimed is:

1. A chassis actuator, comprising:
a rotational-linear transmission adapted for coupling, on an output side, to at least one chassis element, the rotational-linear transmission having:
an input-side element threadably engaged with an output element via non-trapezoidal threads such that rotation of the input-side element linearly displaces the output element to actuate the at least one chassis element, the input-side element mounted in a housing via at least one axial bearing,
an adjustable preloading device mounted to the housing, the adjustable preloading nut applying an adjustable axial force to the at least one axial bearing and the input-side element so as to adjust an efficiency of the chassis actuator to a value corresponding to a locked condition of the rotational-linear transmission.

2. The chassis actuator according to claim 1, wherein the adjustable pre-loading device comprises an adjustable preloading nut screwed into an internal thread of the housing.

3. The chassis actuator according to claim 2, wherein the adjustable preloading nut is in direct contact with a bearing ring of the at least one axial bearing.

4. The chassis actuator according to claim 3, wherein the at least one axial bearing is a roller bearing.

5. The chassis actuator according to claim 4, wherein the at least one axial bearing comprises rolling elements configured to perform both an axial bearing function and a radial bearing function.

6. The chassis actuator of claim 2, wherein the input-side element is a spindle nut and the output element is a threaded spindle.

7. The chassis actuator according to claim 1, wherein the at least one axial bearing comprises a first axial bearing having:
first rolling elements configured to exclusively perform an axial bearing function, and
second rolling elements configured to exclusively perform a radial bearing function, and
the first rolling elements and the second rolling elements are configured to roll directly on a same bearing ring.

8. The chassis actuator according to claim 1, wherein the rotational-linear transmission is a planetary roller gear system.

9. The chassis actuator according to claim 8, wherein the input-side element is rotatably driven via a belt drive.

10. The chassis actuator of claim 1, wherein the at least one axial bearing includes a first axial roller bearing and a second axial roller bearing, and the input-side element is mounted in the housing via: i) the first axial roller bearing arranged on a first side of the input-side element, and ii) the second axial roller bearing arranged on a second side of the input-side element, and the first axial roller bearing and the second axial roller bearing are configured to receive the adjustable axial force.

11. The chassis actuator of claim 10, wherein:
the first axial roller bearing comprises:
first rolling elements configured to exclusively perform an axial bearing function, and
second rolling elements configured to exclusively perform a radial bearing function, and
the second axial roller bearing comprises:
third rolling elements configured to exclusively perform an axial bearing function, and
fourth rolling elements configured to exclusively perform a radial bearing function.

12. The chassis actuator of claim 1, wherein the at least one axial bearing comprises two axial bearings, and the adjustable preloading device loads the two axial bearings.

13. The chassis actuator of claim 1, wherein the efficiency of the chassis actuator is adjusted from a value greater than 50%, which corresponds to an unlocked condition of the rotational-linear transmission, to a value between 35% and 45%, which corresponds to the locked condition of the rotational-linear transmission.

14. A chassis actuator, comprising:
a rotational-linear transmission adapted for coupling, on an output side, to at least one chassis element, the rotational-linear transmission having:
an input-side element threadably engaged with an output element such that rotation of the input-side element linearly displaces the output element to actuate the at least one chassis element, the input-side element mounted in a housing via at least one axial bearing,
an adjustable preloading device mounted to the housing, the adjustable preloading nut applying an adjustable axial force to the at least one axial bearing and the input-side element so as to adjust an efficiency of the chassis actuator from a value corresponding to a back-drivable chassis actuator to a value corresponding to a non-back-drivable chassis actuator.

15. The chassis actuator of claim 14, wherein input-side element is a spindle nut and the output element is a threaded spindle, and the adjustable axial force is configured to load the spindle nut against the threaded spindle.

* * * * *